United States Patent [19]

Ise et al.

[11] Patent Number: 5,094,925

[45] Date of Patent: Mar. 10, 1992

[54] OPTO-MAGNETIC RECORDING MEDIUM

[75] Inventors: Tomokazu Ise, Abiko; Tkeo Takase, Kashiwa, both of Japan

[73] Assignee: Sharp Kabushiki Kaisha, Osaka, Japan

[21] Appl. No.: 544,759

[22] Filed: Jun. 27, 1990

[30] Foreign Application Priority Data

Jun. 30, 1989 [JP] Japan ............................... 1-170648

[51] Int. Cl.$^5$ .............................................. G11B 23/00
[52] U.S. Cl. ...................................... 428/694; 369/13; 428/900
[58] Field of Search ................... 428/694, 900; 369/13; 360/131, 135

[56] References Cited

U.S. PATENT DOCUMENTS

| | | | |
|---|---|---|---|
| 4,556,291 | 12/1985 | Chen | 369/13 |
| 4,645,722 | 2/1987 | Katayama | 428/694 |
| 4,727,005 | 2/1988 | Sato | 428/694 |
| 4,855,975 | 8/1989 | Akasaka et al. | 369/13 |

FOREIGN PATENT DOCUMENTS

| | | |
|---|---|---|
| 258978 | 3/1988 | European Pat. Off. . |
| 330394 | 8/1989 | European Pat. Off. . |
| 107751 | 6/1985 | Japan . |
| 173746 | 9/1985 | Japan . |
| 57-78652 | 1/1989 | Japan . |

OTHER PUBLICATIONS

Saito et al, "Direct Overwrite by Light Power Modulation on Magneto-optical Multi-layered Media," Jap. Jour. Appl. Phys. vol. 26, Supp 26-4 (1987), pp. 155-159.

*Primary Examiner*—Paul J. Thibodeau
*Attorney, Agent, or Firm*—David G. Conlin; Robert F. O'Connell

[57] ABSTRACT

An opto-magnetic recording medium having a perpendicularly magnetized film of a dual layer structure comprising a first layer composed of a rare earth-transition metal amorphous thin alloy film and a second layer composed of a rare earth-transition metal amorphous thin alloy film of a composition different from that of the first layer and having a lower curie point and a larger coercive force as compared with that of said first layer, and being capable of transferring bits recorded at a curie point in said second layer to the first layer by exchange-coupling force, said first layer being composed of a GdDyFeCo film in which the sublattice magnetization for transition metal is predominant at a room temperature, the second layer being composed of TbFeCo series film in which sublattice magnetization for rare earth is predominant at a room temperature, and the directions of predominant magnetization between the first layer and the second layer being opposed to each other.

8 Claims, 8 Drawing Sheets

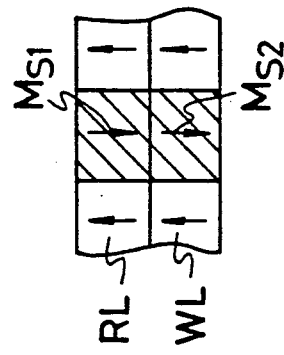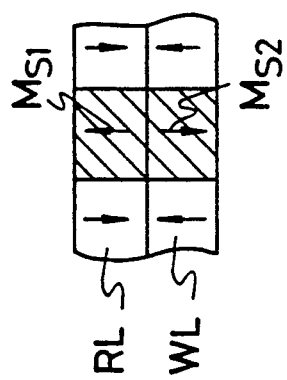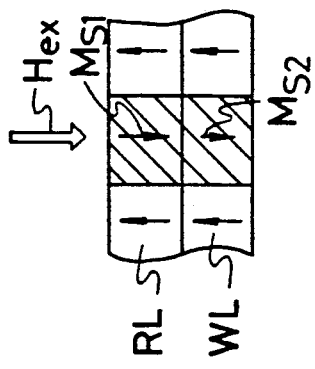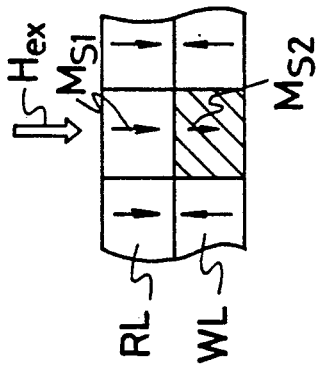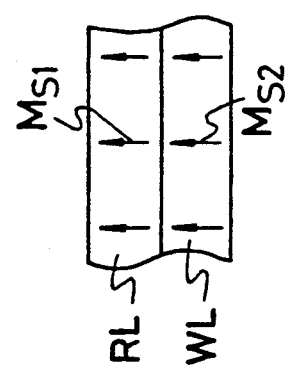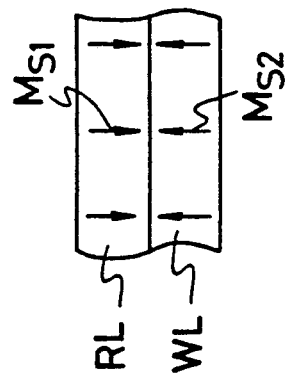

OPTO-MAGNETIC RECORDING MEDIUM

BACKGROUND OF THE INVENTION

1. Field of the Invention

The present invention concerns an opto-magnetic recording medium such as an opto-magnetic disk and, more in particular, it relates to an opto-magnetic recording medium having a perpendicularly magnetized film of a dual layer structure comprising a first layer (reading layer) and a second layer (writing layer) each composed of rare earth-transition metal alloy film.

2. Description of the Related Art

The opto-magnetic recording medium using a thin amorphous alloy film comprising a rare earth metal (RE) and a transition metal (TM) has no sufficient reading characteristics and various improvements have been studied therefor.

As an example, there has been proposed a curie point writing type opto-magnetic recording medium mainly constituted with an exchange-coupled perpendicularly magnetized film of a dual layer structure comprising a writing layer having a low curie point and a large coersive force and a reading layer having a higher curie point and a smaller coersive force as compared with those of the writing layer (Japanese Patent Laid Open Sho 57-78652, "III amorphous multi-layered film", p 294-305 in, Collected Technology for Optical Memory-Opto-Magnetic memory, published from Science Forum Co. Ltd, Oct. 31, 1983).

In the conventional exchange-coupled dual layer film as described above, TbFe, DyFe, TbFeCo, DyFeCo are used for the writing layer and GdFe, GdFeCo, TbFeCo, etc. are used for the reading layer. For improving the C/N ratio which is a ratio between a carrier level and a noise level in an opto-magnetic recording medium thereby improving the reading characteristics, it is necessary to increase the carrier level and reduce the noise level.

Among them, the carrier level may be increased by making the Kerr rotational angle greater in the reading layer, while it is important to increase the exchange-coupling force between the two layers for reducing the noise level.

By the way, for improving the carrier level, it is necessary to use a medium having a great Kerr rotation angle for the reading layer, but a medium of a greater Kerr rotation angle generally has increased saturation magnetization. However, as the saturation magnetization is increased, the recording characteristics of the reading layer become predominant during recording, tending to cause writing noises. In this case, although the carrier level is increased, the noise level is also increased by so much, thereby giving no contribution to the improvement of the C/N ratio.

In view of the above, it is an object of the present invention to improve the C/N ratio as an opto-magnetic recording medium by developing a medium for the reading layer having a great Kerr rotation angle while suppressing the increase of the saturation magnetization as less as possible and controlling the sublattice magnetization for each of the rare earth and the transition metal in each of the writing layer and the reading layer, thereby suppressing the occurrence of writing noises.

The dual layer medium includes, as shown in FIGS. 2(a) and (b), a type in which the magnetization Ms1 and Ms2 in the reading layer RL and the writing layer WL, respectively, are in parallel with each other (hereinafter referred to a P type) and, as shown in FIGS. 3(a) and (b), a type in which the magnetization Ms1 and Ms2 in the reading layer RL and the writing layer WL, respectively, are opposite to each other (hereinafter referred to as A type).

For the dual layer film medium of the P type, as shown in FIGS. 2(a), (b), sublattice magnetization $Ms_{RE}$ for the rare earth RE is predominant in both of the reading layer RL and the writing layer WL (hereinafter the state in which the auxiliary magnetization $Ms_{RE}$ for the rare earth RE is predominant is referred to as RE rich), or sublattice magnetization $Ms_{TM}$ for the transition metal TM is predominant in both of the layers (hereinafter the state in which the sublattice magnetization $Ms_{TM}$ for the transition metal TM is predominant is referred to as TM rich).

On the other hand, for the dual layer film medium of the A type, as shown in FIGS. 3(a) and (b), one of the layers is RE rich and the other of the layers is TM rich in the two layers of the reading layer RL and the writing layer WL. For the sake of the simplicity, explanation will be made hereinafter assuming that both of the reading layer RL and the writing layer WL are TM rich for the P type and that the reading layer RL is TM rich, while the writing layer WL is RE rich for the A type.

In the case of conducting recording to the dual layer film medium of the P type, the directions for the respective magnetization Ms1 and Ms2 in the reading layer RL and the writing layer WL of the medium are arranged previously in one identical direction as shown in FIG. 4(a) and then an external auxiliary magnetic field Hex is applied downwardly in the figure while heating a recording area shown by hatched lines by means of a laser beam, by which the magnetization Ms2 and Ms1 in the writing layer WL and the reading layer RL are turned downwardly in the figure. Then, by way of the temperature lowering process, downward magnetization Ms2 and Ms1 appear in the writing layer Wl and the reading layer RL.

On the other hand, in the case of conducting recording to the dual film medium of the A type, magnetization Ms1 in the reading layer RL and the magnetization Ms2 in the writing layer WL of the medium are arranged, respectively, each in one direction and such that the directions are opposite to each other between the reading layer RL and the writing layer WL. Then, when an external auxiliary magnetic field Hex is applied downwardly in the figure while heating the hatched area by means of the laser beam as shown in FIG. 5(b), the magnetization Ms2 in the writing layer WL is reversed downwardly, whereas the magnetization Ms1 in the reading layer RL remains as it is in the downward direction. Then, in the temperature lowering process after completion of the laser beam irradiation, magnetization Ms1 in the reading layer RL turned upwardly in the figure due to the exchange coupling between the two layers and information is recorded on the hatched portion in the reading layer RL.

By the way, in order to obtain excellent recording characteristics in the opto-magnetic recording medium, it is necessary that the shape of bits written into the reading layer RL has a regular and well-arranged shape. For this purpose, it is necessary in the case of the dual layer film medium of the P type that bits, when recorded in the reading layer RL, do not diffuse into other region than the area of the writing layer WL that reaches the temperature near the curie point (laser beam irradiated area) by the exchanging force between the two layers.

In the case of the dual layer film medium of the A type, it is necessary to form regular and well-arranged bits in the writing layer WL and transfer them to the reading layer RL.

Then, necessary conditions required for each of the P and A types in each of the recording and temperature lowering processes are as shown in Table 1 according to the theoretical calculations.

TABLE 1

| Type | Recording $H_{ex} = H_B$ |
|---|---|
| P | $H_1 + \dfrac{\delta w}{2M_{s_1}h_2} > H_B > H_2 + \dfrac{\delta w}{2M_{s_2}h_2}$ |
| A | $H_B > H_2 + \dfrac{\delta w}{2M_{s_2}h_2}$ |

| | Temperature lowering | |
|---|---|---|
| Type | $H_{ex} = 0$ | $H_{ex} = H_B$ |
| P | $M_{s_2}h_2H_2 > M_{s_1}h_1H_1$ | $H_B > H_1 - \dfrac{\delta w}{2M_{s_1}h_1}$ and $H_B > -H_2 + \dfrac{\delta w}{2M_{s_2}h_2}$ |
| A | $M_{s_2}h_2H_2 > M_{s_1}h_1H_1$ | $\dfrac{\delta w}{2M_{s_1}h_1} - H_1 > H_B > \dfrac{\delta w}{2M_{s_2}h_2} - H_2$ |

From Table 1, it is necessary as a measure for the development of the dual layer film medium, to make the magnetization $M_{s_1}$ in the reading layer RL smaller, the magnetization $M_{s_2}$ in the writing layer WL larger and, further, to establish a relationship between $M_{s_1}$ and $M_{s_2}$ including $H_1$, $H_2$, $h_1$, $h_2$ as:

$$M_{s_2} \times H_2 \times h_2 > M_{s_1} \times H_1 \times h_1$$

$H_1$ ... coersive force of the reading layer RL at that temperature.

$H_2$ ... coersive force of the writing layer WL at that temperature.

$h_1$ ... film thickness of the reading layer RL $h_2$ ... film thickness of the writing layer WL $\sigma w$ ... boundary magnetic wall energy at a temperature in this case $H_{ex}$ ... external auxiliary magnetic field (applied in the direction opposite to that for the magnetization in the writing layer WL)

By the way, the film thickness $h_2$ of the writing layer WL has to be within such a range as capable of undergoing the exchanging force from the boundary between both of the layers and, if the magnetization $M_{s_2}$ in the writing layer WL is excessively large, a stray magnetic field or demagnetizing field is increased to cause distortion in the shape of the recorded bits even if in the curie point recording.

On the other hand, the reading layer RL is required to have a great Kerr rotation angle $\theta k$, and small saturation magnetization Ms and coersive force Hc. On the other hand, GdFeCo among the reading layer media used at present has a rather great Kerr rotational angle $\theta k$ of about 0.46° (at a measuring wavelength of 780 nm), in which the saturation magnetization Ms and the coersive force Hc are about 50 emu/cm³ and 0.5 KOe, respectively. Accordingly, for improving the C/N ratio further, it is necessary to develop a medium having a greater Kerr rotational angle $\theta k$ than that of GdFeCo while suppressing Ms and Hc.

The present inventor has sought for media adaptible to the conditions as described above among quaternary rare earth-transition metal opto-magnetic recording media and has found that GdDyFeCo is particularly excellent as the reading layer medium.

More specifically, in the following formula: $(Gd_{100-x}Dy_x)_Z(Fe_{100-y}Co_y)_{100-Z}$, the Kerr rotation angle $\theta k$ is increased to greater than 0.48° within a range: X, Y, Z as X = 5–25 atm %, Y = 18–30 atm % and Z = 16–24 atm %. In particular, the Kerr rotational angle $\theta k$ can be increased to 0.54 while suppressing the saturation magnetization Ms to less than 250 emu/cm³ in a TM rich composition ratio in which X is about 20 atm % and the coersive force Hc is less than 2 KOe. The Kerr rotational angle $\theta k$ is increased by 17.4% as compared with that of usual CdFeCo.

By the way, although the value for the saturation magnetization Ms can be suppressed relatively low as 250 emu/cm³, it is rather increased as compared with that of the conventional reading layer medium. Therefore, in order to form regular and well-arranged bits while satisfying the conditions in Table 1, it is necessary that the saturation magnetization Ms in the writing layer WL is also made greater relatively.

Further, a large coersive force Hc is required for the writing layer medium and, at the same time, a lower curie temperature Tc is required for the improvement of the recording sensitivity. Accordingly, a medium having a curie temperature Tc between 100° to 150° C. has predominantly been used. However, according to the study of the present inventor, it has been found that there is no practical problems in view of the recording sensitivity so long as the curie temperature Tc is up to about 190° C. Accordingly, the range for selecting the writing layer can be widened as compared with the usual case.

Then, as a result of our search under the foregoing conditions, the inventors have been found that TbFeCo is excellent as the writing layer. In particular, in the following formula representing the composition ratio:

$$Tb_X(Fe_{100-Y}Co_Y)_{100-X}$$

both of the saturation magnetization Ms and the coersive force Hc could be increased while restricting the curie temperature Tc to 155°–195° C. by defining X as 15 to 30 atom % and Y as 6 to 12 atom %, respectively.

In view of the relationship with the recording process described later, if the saturation magnetization Ms for the reading layer medium is large, it is necessary that TbFeCo has RE rich composition ratio near the compensation composition with X being greater than 25 atom %, and such a composition ratio that predominant magnetization does not turn from RE into TM in the temperature elevation process due to the irradiation of laser beams upon recording. If a portion of Tb in TbFeCo is substituted with other rare earth element such as Ge, Dy, Ho or Nd, for controlling the curie temperature, TbFeCo can be used sufficiently as the writing layer medium, so long as RE rich composition ratio is kept.

Then, for suppressing writing noises, the inventors have examined as to which of the P or A type film medium is suitable.

In the dual layer film medium of the P type in which the directions of magnetization $M_{s_1}$, $M_{s_2}$ in the reading layer RL and the writing layer WL are in parallel with each other, bits formed by the external auxiliary magnetic field and the stray magnetic field to the laser beam irradiated area of the reading layer RL upon recording undergo the effect of exchanging force between both of the layers and, accordingly, are not diffused to the outside of the area of the writing layer WL that reaches a temperature near the curie point (laser beam irradiation area), but can take any optional shape within a range near the curie temperature.

Accordingly, if the saturation magnetization Ms of the reading layer RL is large, the bits formed in the reading layer RL are disturbed at the outer periphery or tend to form multiple polymagnetic domains so as to reduce the magnetostatic energy within the region near the curie temperature of the writing layer WL. The bits thus formed irregularly also form irregular shape of bits in the writing layer WL in the temperature lowering process. Accordingly, in the case of using a medium of large saturated magnetization Ms as in the present invention, the P type dual layer film medium is not suitable.

Then, in the case of using the A type dual layer film medium in which the directions of the magnetization $Ms_1$, $Ms_2$ of the reading layer RL and the writing layer WL are opposite to each other, since the magnetization $Ms_1$ of the reading layer RL has the same direction with that of the external auxiliary magnetic field Hex upon forming bits in the writing layer WL during recording, as shown in FIG. 5(b), bits are not formed in the reading layer RL during irradiation of the laser beam. Then, the bits can be formed in the reading layer RL only by means of the transfer of regular and well-arranged bits having been formed in the writing layer WL by the curie point recording, in the course of the temperature lowering process to the reading layer RL by the exchanging force. Thus, the conditions shown in Table 1 should be satisfied so as to realize the transfer for the A type.

As has been described above, improvement for the exchange-coupling force between the two layers is necessary for reducing the writing noises in the dual layer film structure as has been pointed out, but it is not yet still sufficient. The A type dual layer film structure is considered to be preferably for a medium having a large saturation magnetization with an aim of improving the Kerr rotation angle θk for the reading layer RL.

SUMMARY OF THE INVENTION

Based on the result of the study as described above, the present invention provides an opto-magnetic recording medium having a perpendicularly magnetized film of a dual layer structure comprising a first layer (reading layer) composed of a rare earth-transition metal amorphous thin alloy film and a second layer (writing layer) composed of a rare earth-transition metal amorphous thin alloy film with a composition different from that of the first layer and having a lower curie point and a larger coercive force as compared with those of the first layer, in which bits formed by curie point recording in the second layer are transferred by means of the exchange coupling force to the first layer, wherein the first layer is constituted with a GdDyFeCo film in which sublattice magnetization for the transition metal at a room temperature is predominant and the second layer is constituted with a TbFeCo series film in which the sublattice magnetization for the rare earth element at a room temperature is predominant, and the directions of the predominant magnetization in the first layer and the second layer are opposed to each other.

BRIEF DESCRIPTION OF THE DRAWINGS

FIGS. 4(a)-(c) are explanatory views illustrating the recording step of information to the P type dual layer film;

FIGS. 5(a)-(c) are explanatory views illustrating the recording step of information to the A type dual layer film;

DETAILED DESCRIPTION OF THE PREFERRED EMBODIMENT

Figure 1:
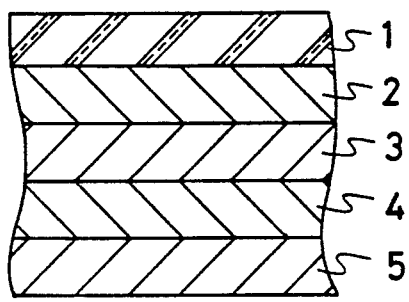
FIG. 1 is a schematic perpendicularly cross sectional view for an opto-magnetic disk according to the present invention.

The GdDyFeCo film for the first layer in the opto-magnetic recording medium according to the present invention preferably comprises a rare earth-transition metal alloy of the composition represented by the following formula:

$$(Gd_{100-X}Dy_X)_Z(Fe_{100-Y}Co_Y)_{100-Z}$$

in which X, Y and Z are, respectively, within the range: X=5-25 atm %, Y=18-30 atm % and Z=16-24 atm %.

The second layer preferably comprises a rare earth-transition metal alloy of TbFeCo or TbFeCo in which Tb is partially (ca. 5-20%) substituted with rare earth element other than Tb such as Gd, Dy, Nd and Ho, and in which the curie point is set to higher than 155° C. and sublattice magnetization for rare earth remains predominant upon temperature elevation for recording.

Each of the layers can be formed by means of a known method such as vapor deposition, sputtering or CVD.

Upon recording, the recording medium comprising the second layer (writing layer) previously magnetized perpendicularly in one direction and the first layer (reading layer) magnetized in the direction opposite to that of the second layer (writing layer) by means of the exchange-coupling force is irradiated with a laser beam emitted from a semiconductor laser, etc. and, at the same time, applied with an external auxiliary magnetic field in the direction opposite to that of the magnetization in the second layer (writing layer). In this case, the area in the second layer (writing layer) irradiated with the laser beam is heated to a temperature near the curie point and the coercive forces is reduced.

As a result, in the laser beam irradiated area of the second layer (writing layer), bits magnetized in the direction opposite to the peripheral area are formed by the external auxiliary magnetic field and the stray magnetic field. Subsequently, in the temperature lowering process after the completion of the laser beam irradiation, the bits recorded in the second layer (writing layer) are transferred by the exchange-coupling force to the first layer (reading layer). Reproduction is conducted by reading the bits recorded in the first layer (reading layer) by the laser beam.

In this instance, since a GdDyFeCo film of predominant sublattice magnetization for transition metal at a room temperature (10°-50° C., typically 25° C.) is used as the first layer (reading layer) in the present invention, the Kerr rotational angle in the first layer (reading layer) can be increased and, at the same time, increase of the saturation magnetization and the coercive force along with the increase of the Kerr rotational angle can be suppressed.

In addition, since a TbFeCo film mainly comprising TbFeCo of predominant sublattice magnetization for rare earth at a room temperature is used as the second layer (writing layer), it is possible to obtain a large coercive force and a relatively low curie temperature necessary for the second layer. Further, the saturation magnetization for the second layer (writing layer) can also be increased corresponding to the increase of the saturation magnetization in the first layer (reading layer).

Since the directions of predominant magnetization are set opposite to each other between the first layer and the second layer, regular and well-arranged bits after being recorded in the second layer (writing layer) can be transferred by means of the exchange force with a regular and well-arranged shape to the first layer (reading layer), thereby enabling to reduce writing noises.

EXAMPLES

The present invention will be described by way of its preferred embodiments referring to FIGS. 1 through 9.

As shown in FIG. 1, an opto-magnetic disk as an optomagnetic recording medium comprises a disk substrate 1 made of glass, and a first SiO layer 2 for enhancing the Kerr rotational angle $\theta k$, a reading layer 3 as the first layer, a writing layer 4 as the second layer 2 and a second SiO layer 5 as a protection layer laminated on the substrate 1. The film thickness for each of the layers is set, for example, to 82 nm for the first SiO layer 2, 40 to 50 nm for the reading layer 3, 100 nm for the writing layer 4 and 55 nm for the second SiO layer 5 respectively. The reading layer 3 and the writing layer 4 were formed by using two electron beam heating vacuum deposition devices and vapor depositing transition metal (TM) from one direction and rare earth (RE) from the other direction simultaneously. Each of the layers 2–5 was laminated on the disc substrate 1 within one identical vacuum vessel without changing the vacuum state. Further, for preparing the optomagnetic disk described above, a glass disk substrate of 130 mm diameter manufactured by Corning Co. in USA was used as the disk substrate 1. As the disk substrate 1, a resin substrate made of polycarbonate, PMMA (acrylic resin) or epoxy resin may be used in place of the glass substrate. Instead of the SiO layer, dielectric material such as AlN, SiN or $SiO_2$ may also be used.

Table 2 described below shows the results of measurement for coercive force Hc, Kerr rotational angle $\theta K$ and the saturation magnetization Ms, while varying the composition ratio in the GdDyFeCo layer as the reading layer 3. For the measurement of the reading layer 3, a micro-sheet (0211) manufactured by the Corning Co. was used as the substrate and only the reading layer 3 and the protection layer 5 were formed at 100 nm and 55 nm thickness respectively on the substrate. The Kerr rotational angle was measured at a wavelength of 780 nm from the side of the substrate.

In the table, specimens Nos. 1, 2, 4 through 8, 11 and 12 are included within the range of the composition of the present invention and remaining specimens Nos. 3, 9, 10 and 13 through 15 are out of the range of the composition of the present invention. As can be seen from the table, within the range of the composition of the present invention of the following formula:

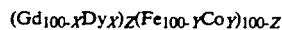

$(Gd_{100-X}Dy_X)_Z(Fe_{100-Y}Co_Y)_{100-Z}$ in which X=5–25 atm %, Y=18–30 atm % and Z=16–24 amt % respectively, a Kerr rotational angle $\theta k$ of greater than 0.48° was obtained as measured from the side of the substrate with a laser beam used for the measurement at a wavelength $\lambda$=780 nm. In particular, the specimen No. 8 is suitable as the reading layer 3 since a great Kerr rotational angle $\theta k$ and a relatively small coercive force Hc can be obtained while suppressing the saturation magnetization Ms to less than 250 $emu/cm^3$.

Figure 6:
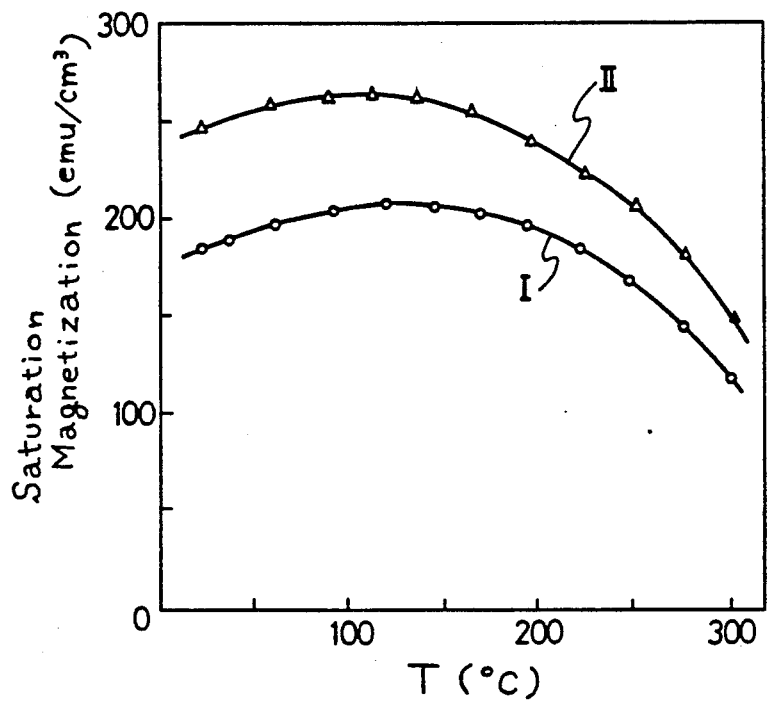
FIG. 6 is a graph showing a relationship between the temperature and the saturation magnetization in GdDyFeCo and GdTbFeCo alloys used in the present invention.

In this experiment, it has been found that CdTbFeCo also has a Kerr rotational angle $\theta k$ of greater than 0.50° with the same range composition as that of GdDyFeCo. However, since the saturation magnetization Ms of GdTbFeCo under the identical coercive force Hc with that of GdDyFeCo is much larger than that of GdDyFeCo, it is difficult to satisfy the conditions for the recording process shown in Table 1. FIG. 6 shows a relationship between the temperature and the saturation magnetization for $(Gd_{90}Dy_{10})_{21.4}(Fe_{81.5}Co_{18.5})_{78.6}$ by a curve I and relationship between the temperature and the magnetization for $(Gd_{90}Tb_{10})_{20.3}(Fe_{81.5}Co_{18.5})_{79.7}$ by a curve II. The coercive force Hc at a room temperature of the two kinds of media are equal to each other.

Further, when taking notice only on the Kerr rotational angle $\theta k$, the Kerr rotational angle $\theta k$ can be increased to greater than 0.55° in any of the medium of GdDyFeCo and GdTbFeCo in which the composition ratio Fe: Co between the transition metals is 60–80: 40–20 and the composition ratio between the rare earth elements is about 50:50, the status is TM rich and the coercive force Hc is less than about 2 KOe. However, since the saturation magnetization Ms is extremely increased as larger than 300 $emu/cm^3$ in such a composition region, the conditions for the recording process shown in Table 1 can not be satisfied.

Then, relationship for composition ratio, and coercive force Hc, Kerr rotational angle $\theta k$ and saturation magnetization Ms of TbFeCo as the writing layer 4 was measured in this experiment. Also in this case, the microsheet (0211) manufactured by Coning Co. was used as the substrate and only the writing layer 4 and the protection layer 5 were formed on the substrate for measurement.

Figure 7:
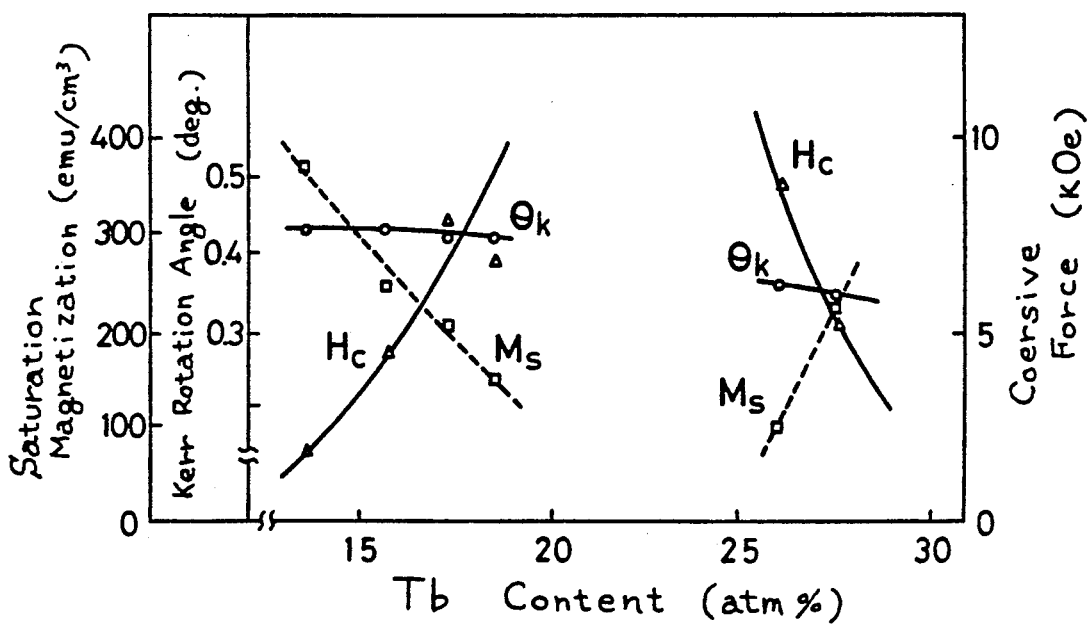
FIGS. 7 and 8 are, respectively, graphs showing a relationship, between the Tb content and the saturation magnetization, the Kerr rotational angle and the coercive force in TbFeCo used in the present invention.
Figure 8:
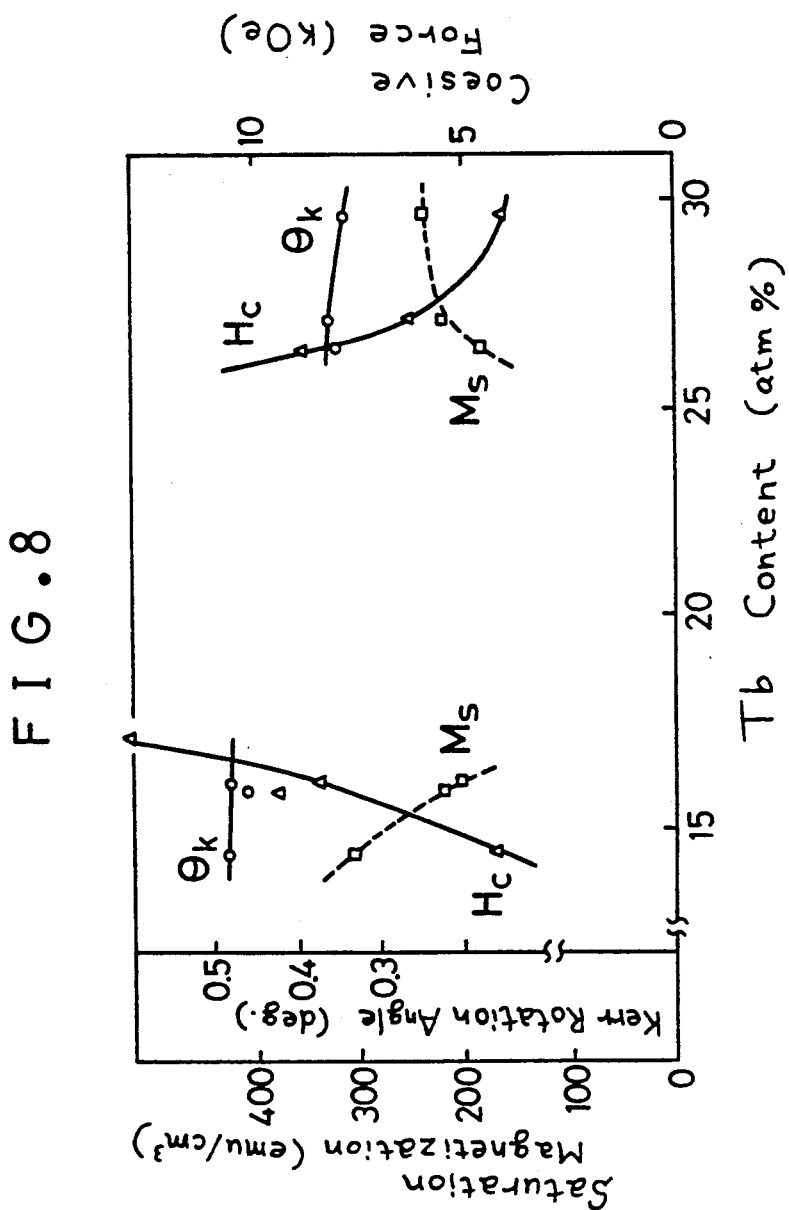

FIG. 7 shows the change of characteristics in $Tb_X(Fe_{93.8}Co_{6.2})_{100-X}$ when the Tb content X was varied and FIG. 8 shows the change of the characteristics of $Tb_X(Fe_{89.5}Co_{10.5})_{100-X}$ when the Tb content X was varied.

Figure 9:
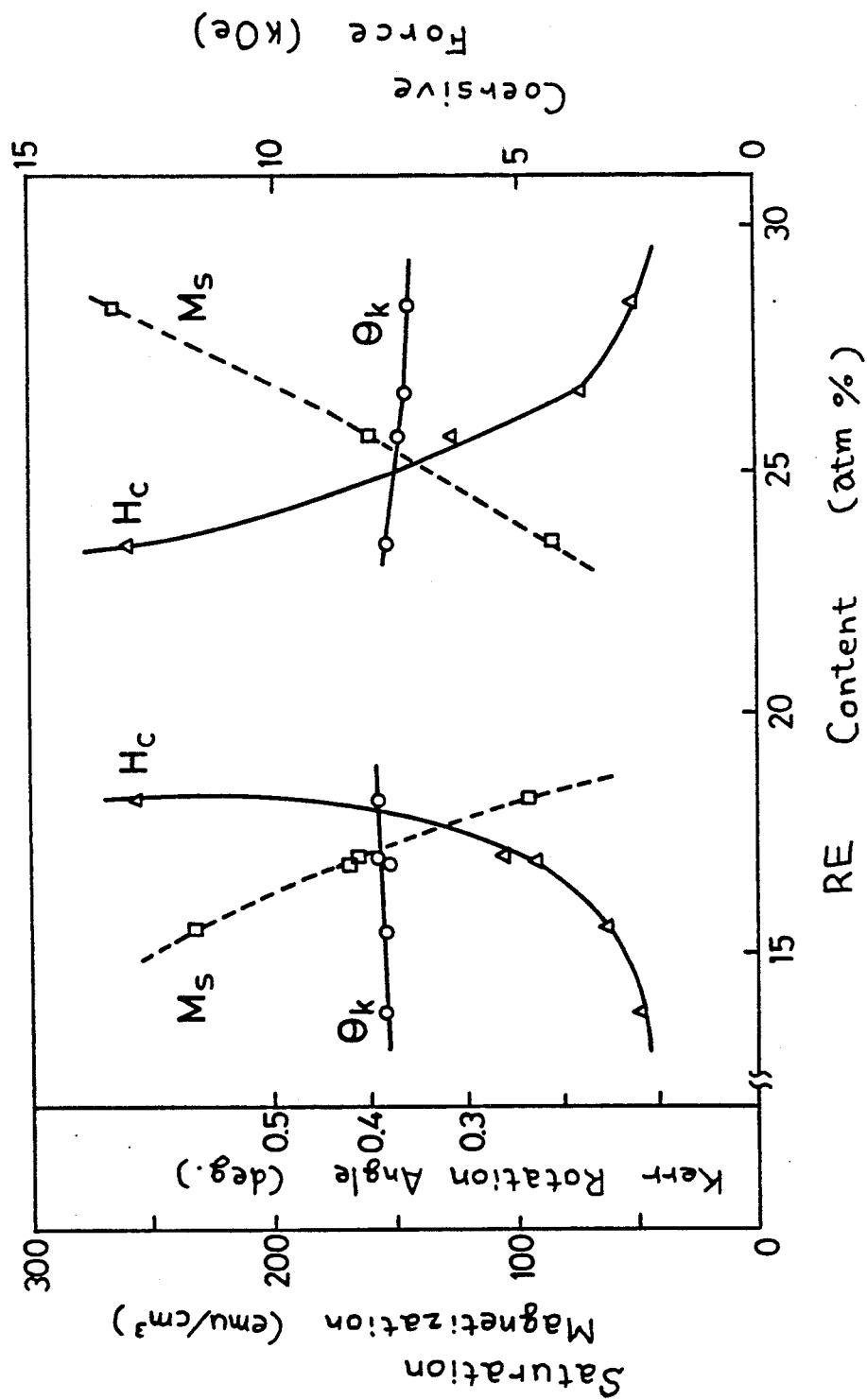
FIG. 9 is a graph showing a relationship between the rare earth content and the saturation magnetization, the Kerr rotational angle and the coercive force in GdTbFe used in the present invention.

Further, as other example of the composition, FIG. 9 shows the changes for coercive force Hc, Kerr rotational angle $\theta k$, and saturation magnetization Ms of: $(Gd_{50}Tb_{50})_XFe_{100-X}$ when X was varied.

In FIGS. 7–9, when the saturation magnetization Ms at an identical coercive force Hc is compared, the saturation magnetization Ms for TbFeCo is larger than that for GdTbFe. Further, in TbFeCo, saturation magnetization Ms is larger as the amount of Co is increased. Further, curie temperature Tc for each of the media, the characteristics of which are shown in FIGS. 7–9, are 150° to 175° C. for $(Gd_{50}Tb_{50})_XFe_{100-X}$ in FIG. 9, 155°–160° C. for $Tb_X(Fe_{93.8}Co_{6.2})_{100-X}$ in FIG. 7 and 175°–185° C. for $Tb_X(Fe_{89.5}Co_{10.5})_{100-X}$ in FIG. 8. As has been described above, since it has been found that the curie temperature Tc may be about 190° C. in view of the practical recording sensitivity, $Tb_X(Fe_{89.5}Co_{10.5})_{100-X}$ is excellent for the writing layer 5. If higher recording sensitivity is required, an element of Tb in TbFeCo may be partially substituted with Dy. In the opposite case, Tb may be partially replaced with Gd.

Table 3 shows the result of measurement for saturation magnetization Ms, coercive force Hs and writing noises in each of the layers when the composition and the film thickness for the reading layer 3 and the writing layer 4 were varied in the dual layer film medium. Each of the dual layer film media has a structure as shown in FIG. 1.

The reading layer (RL) 3 was formed to a film thickness of 40 to 50 nm on the first SiO layer 2. Since the thickness of the reading layer (RL) 3 was reduced in the disk formation as compared with the case of the measurement in Table 2 (formed to a thickness of 100 nm on the microsheet), the conditions as the reading layer shown in Table 1 can sufficiently be satisfied. In this case, it is desirable that the entire thickness of the dual layer film is from 15 to 300 nm and the film thickness of the writing layer 4 is made greater than that of the reading layer 3.

Evaluation conditions for recording/reproduction were set as: number of rotation of the disk to 1800 rpm, recording diameter to 110 mm$\phi$, recording frequency to 1 MHz, recording duty to 50% and reproducing laser power to 1.5 mW, and the recording laser power Pw and the external auxiliary magnetic field Hex were set so as to minimize the writing noises in each of the specimens.

Figure 2A:
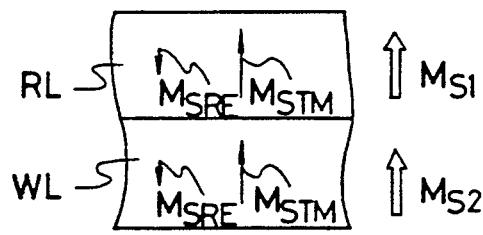
FIGS. 2(a) and (b) are explanatory views illustrating the arrangement of sublattice magnetization in the P type dual layer film.
Figure 2B:
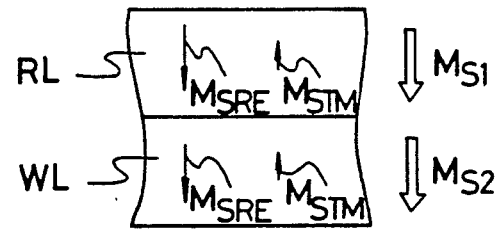
Figure 3A:
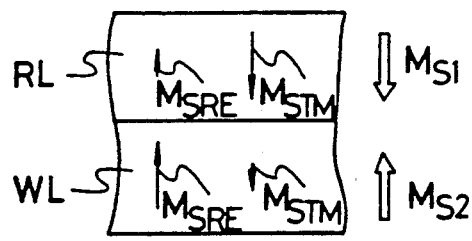
FIGS. 3(a) and (b) are explanatory views illustrating the arrangement of sublattice magnetization in the A type dual layer film.
Figure 3B:
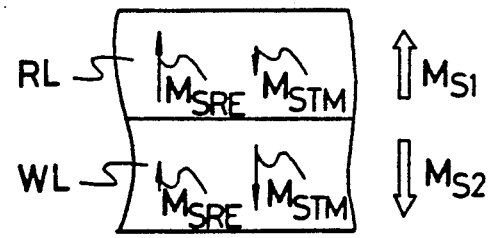

In Table 3, specimens Nos. 1–4 are disks of P type in which both the reading layer (RL) 3 and the writing layer (WL) 4 are TM rich (refer to FIGS. 2(a), (b) and FIGS., 4(a)–(c) and the writing noises are reduced so reduced as to satisfy the conditions for the recording process in the P type shown in Table 1. In particular, occurrence of the writing noises is suppressed substantially to 0 dB in the specimen No. 4. It can be understood from the comparison between the specimen No. 1 and the specimen No. 2 that TbFeCo is more excellent over GdTbFe as the writing layer (WL) 4.

In the specimen No. 5 of Table 3, GdDyFeCo of the same composition as that for the specimen No. 4 was used for the reading layer (RL) 3, while TbFeCo for the writing layer (WL) 4 was changed from the TM rich composition ratio to the RE rich composition ratio. The specimen No. 5 can satisfy the conditions for the recording process of the A type shown in Table 1 (refer to FIGS. 3(a), (b) and FIGS. 5(a)–(c), in which the writing noises are substantially reduced to 0 dB like that in the specimen No. 4.

The boundary magnetic wall energy $\sigma w$ as a measure for the exchange-coupling force between the reading layer (RL) 3 and the writing layer (WL) 4 in the specimens Nos. 1–5 is 2.0 erg/cm² for the specimen No. 1, 2.5 erg/cm² for the specimen No. 2, 1.8 erg/cm² for the specimen No. 3, 2.5 erg/cm² for the specimen No. 4, and 1.4 erg/cm² for the specimen No. 5. Accordingly, it can be understood that the magnitude of the writing noises can not be defined only based on that of the boundary magnetic wall energy $\sigma w$.

It can be seen from the foregoings that the writing noises can be suppressed sufficiently with any one of the A type or type P constitution if the conditions for the recording process in Table 1 are satisfied sufficiently in the reading layer (RL) 3 = $(Gd_{90}Dy_{10})$ $(Fe_{81.5}Co_{19.5})$/writing layer (WL) 4 = $Tb(Fe_{93.8}Co_{6.2})$ system (specimens Nos. 2–5). However, in the reading layer (RL) 3 = $(Gd_{90}Dy_{10})$ $(Fe_{81.5}Co_{18.5})$/writing layer (WL) 4 = $Tb(Fe_{93.8}Co_{6.2})$ system, saturation magnetization Ms of the reading layer (RL) 3 is relatively decreased and, there is left a problem that the Kerr rotational angle $\theta k$ of the reading layer (RL) 3 can not be increased sufficiently.

Next, in the specimens Nos. 6–8, a composition of $(Gd_{80}Dy_{20})$ $(Fe_{81.5}Co_{18.5})$ is used as the reading layer (RL) 3 for increasing the saturation magnetization Ms of the reading layer (RL) 3 to obtain a sufficiently great Kerr rotational angle $\theta k$. On the other hand, $Tb(Fe_{89.5}Co_{10.5})$ is used for the writing layer (WL) 4. The specimen No. 6 uses a composition ratio which is always TM rich, the specimen No. 7 uses a composition ratio which is TM rich at a normal temperature and RE rich upon recording (at high temperature) and the specimen No. 8 uses a composition ratio which is always RE rich.

Although any of the specimen Nos. 6–8 can sufficiently satisfy the conditions for the recording process in Table 1, relatively large writing noises are generated in the composition of the specimens Nos. 6, 7. On the other hand, in the specimen No. 8, since the writing noises are substantially reduced to 0 dB and the saturation magnetization Ms for the reading layer (RL) 3 is relatively large, a great Kerr rotational angle can be obtained. Accordingly, among each of the specimens shown in Table 3, the specimen No. 8 gives most excellent composition. However, the composition for the reading layer (RL) 3 and the writing layer (WL) 4 is not necessarily restricted to that for the specimen No. 8, and any of the compositions may be used so long as it is within the composition range according to the present invention as described above.

As has been described above, in the case of keeping the a Kerr rotational angle $\theta k$ greater by increasing the saturation magnetization Ms to some extent for the reading layer (RL) 3, it has been found that if the composition of the reading layer (RL) 3 is TM rich at a room temperature, it is necessary that the composition of the wiring layer (WL) 4 is RE rich at a room temperature and that the RE rich is not reversed to a TM rich composition in the temperature elevating process upon recording.

(reading layer), it is possible to increase the Kerr rotational angle for the first layer (reading layer) while suppressing the increase of the saturation magnetization and the coercive force along with the increase of the

TABLE 2

Relation between GdDyFeCo composition and Hc, $\theta k$, Ms

| Sample No. | Composition (atm %) | Hc (KOe) | $\theta k$ (°) | Ms (emu/cm$^2$) |
|---|---|---|---|---|
| 1 | $(Gd_{95}Dy_5)_{18.3}(Fe_{81.5}Co_{18.5})_{81.7}$ | 0 | 0.53* | 353 |
| 2 | $(Gd_{95}Dy_5)_{23.2}(Fe_{81.5}Co_{18.5})_{76.5}$ | 0.32~0.46 | 0.49 | 96 |
| 3 | $(Gd_{95}Dy_5)_{29.1}(Fe_{81.5}Co_{18.5})_{70.9}$ | 0.24~0.38 | 0.44 | 96 |
| 4 | $(Gd_{90}Dy_{10})_{16.7}(Fe_{79.0}Co_{20.0})_{83.3}$ | 0.2~0.4 | 0.50 | 205 |
| 5 | $(Gd_{90}Dy_{10})_{21.4}(Fe_{81.5}Co_{18.5})_{78.6}$ | 0.24~0.7 | 0.49 | 184 |
| 6 | $(Gd_{90}Dy_{10})_{23.2}(Fe_{81.5}Co_{18.5})_{76.8}$ | 3.8~4.2 | 0.48 | 108 |
| 7 | $(Gd_{80}Dy_{20})_{18.3}(Fe_{81.5}Co_{18.5})_{81.7}$ | 0.7~3.0 | 0.52 | 354 |
| 8 | $(Gd_{80}Dy_{20})_{20.3}(Fe_{81.5}Co_{18.5})_{79.7}$ | 1.2~1.8 | 0.54 | 248 |
| 9 | $(Gd_{80}Dy_{20})_{24.3}(Fe_{81.5}Co_{18.5})_{75.7}$ | 6.4~6.8 | 0.48 | 65 |
| 10 | $(Gd_{80}Dy_{20})_{29.1}(Fe_{81.5}Co_{18.5})_{70.8}$ | 6.2~6.8 | 0.39 | 86 |
| 11 | $(Gd_{80}Dy_{20})_{20.3}(Fe_{75}Co_{25})_{79.7}$ | 1.5~2.8 | 0.54 | 258 |
| 12 | $(Gd_{80}Dy_{20})_{23.2}(Fe_{75}Co_{25})_{76.8}$ | 6.6~7.1 | 0.50 | 135 |
| 13 | $(Gd_{80}Dy_{20})_{25.3}(Fe_{81.5}Co_{18.5})_{74.7}$ | 8.0~8.4 | 0.46 | 50 |
| 14 | $(Gd_{80}Dy_{20})_{32.5}(Fe_{81.5}Co_{18.5})_{67.5}$ | 3.2~3.5 | 0.35 | 182 |
| 15 | $(Gd_{80}Dy_{20})_{34.4}(Fe_{81.5}Co_{18.5})_{65.6}$ | 0.6~2.0 | 0.35 | 244 |

*saturation value

TABLE 3

Relation between dual layer structure and writing noise

| Sample No. | | Composition (atm %) | Thickness (nm) | Magnetic property (mono layer, room temp.) | | Evaluation result | | |
|---|---|---|---|---|---|---|---|---|
| | | | | Ms (emu/cm$^3$) | Hc (KOe) | Pw (mW) | Hex (Oe) | Writing noise (dB) |
| 1 | RL | $(Gd_{90}Tb_{10})_{20.3}(Fe_{81.5}Co_{18.5})_{79.7}$ | 50 | 240 | 0.4 | 6.3 | 450 | 3.6 |
| | WL | $(Gd_{30}Tb_{70})_{15.8}Fe_{84.2}$ | 100 | 220 | 4.6 | | | |
| 2 | RL | $(Gd_{90}Tb_{10})_{20.3}(Fe_{81.5}Co_{18.5})_{79.7}$ | 50 | 240 | 0.4 | 7.1 | 450 | 2.4 |
| | WL | $Tb_{16.7}(Fe_{93.8}Co_{6.2})_{83.3}$ | 100 | 232 | 5.8 | | | |
| 3 | RL | $(Gd_{90}Dy_{10})_{21.4}(Fe_{81.5}Co_{18.5})_{78.6}$ | 50 | 184 | 0.45 | 7.0 | 450 | 1.4 |
| | WL | $Tb_{17.4}(Fe_{93.8}Co_{6.2})_{82.6}$ | 100 | 196 | 7.0 | | | |
| 4 | RL | $(Gd_{90}Dy_{10})_{22.2}(Fe_{81.5}Co_{18.5})_{77.8}$ | 50 | 150 | 0.5 | 5.6 | 450 | Less than 0.5 |
| | WL | $Tb_{17.5}(Fe_{93.8}Co_{6.2})_{82.5}$ | 100 | 190 | 7.1 | | | |
| 5 | RL | $(Gd_{90}Dy_{10})_{22.2}(Fe_{81.5}Co_{18.5})_{77.8}$ | 50 | 150 | 0.5 | 4.6 | 450 | Less than 0.5 |
| | WL | $Tb_{27.5}(Fe_{93.8}Co_{6.2})_{72.2}$ | 100 | 240 | 4.9 | | | |
| 6 | RL | $(Gd_{80}Tb_{20})_{20.2}(Fe_{81.5}Co_{18.5})_{79.8}$ | 40 | 250 | 0.5 | 7.1 | 450 | 4.3 |
| | WL | $Tb_{16.4}(Fe_{89.5}Co_{10.5})_{83.6}$ | 100 | 168 | 9.8 | | | |
| 7 | RL | $(Gd_{80}Tb_{20})_{20.5}(Fe_{81.5}Co_{18.5})_{79.5}$ | 40 | 234 | 0.55 | 8.0 | 450 | 8.0 |
| | WL | $Tb_{25.1}(Fe_{89.5}Co_{10.5})_{74.9}$ | 100 | Less than 100 | More than 13 | | | |
| 8 | RL | $(Gd_{80}Tb_{20})_{20.2}(Fe_{81.5}Co_{18.5})_{79.8}$ | 40 | 250 | 0.5 | 7.9 | 300 | Less than 0.5 |
| | WL | $Tb_{26.4}(Fe_{89.5}Co_{10.5})_{73.6}$ | 100 | 180 | 8.8 | | | |

Figure 10:
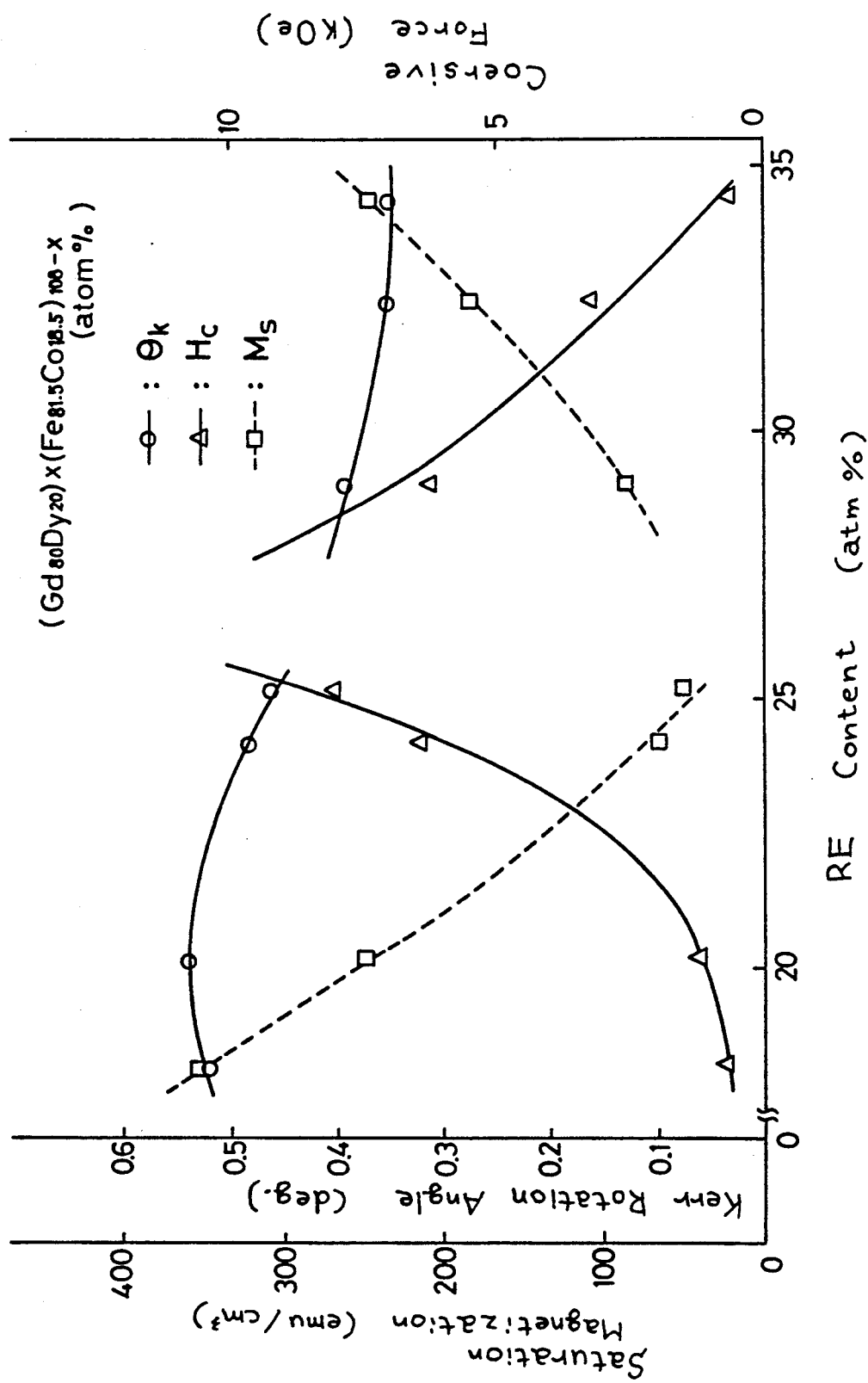
FIG. 10 is a graph showing X-dependency of Ms, Hc and θk in the alloy of the composition: $(Gd_{80}Gy_{20})_X$  $(Fe_{81.5}Co_{18.5})_{100-X}$ used in the present invention.

For the reference, FIG. 10 shows the X-dependency of Ms, Hc and $\theta k$ in the composition of: $(Gd_{80}Dy_{20})_X$-$(Fe_{81.5}Co_{18.5})_{100-X}$. In this case, the compositions with X=20-21 and with greater $\theta k$ correspond to the specimen Nos. 6, 7 and 8 (reading layer) in Table 3.

Figure 11:
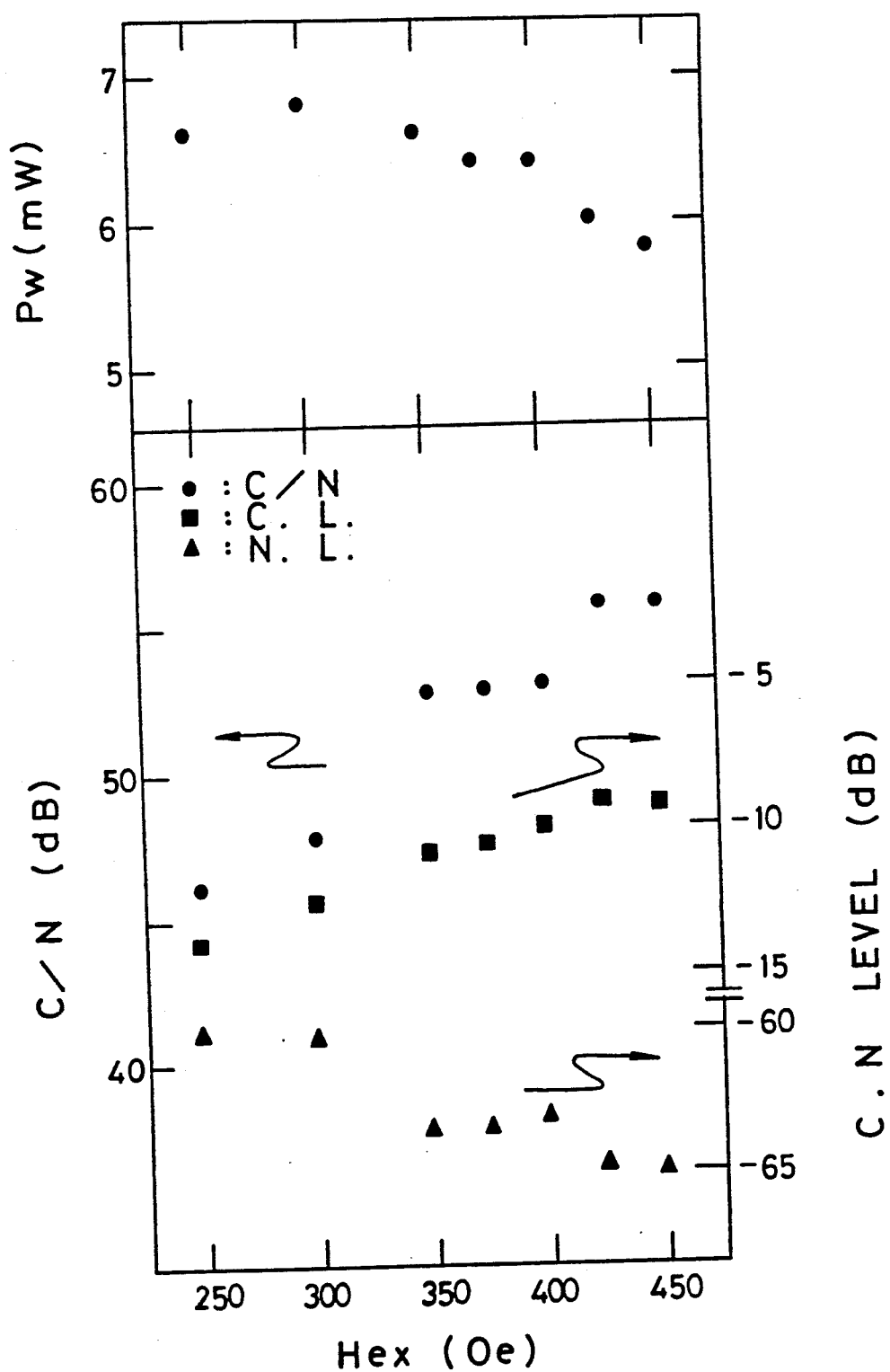
FIGS. 11 and 12 are, respectively, graphs illustrating the dependency of the recording/reproducing characteristics of the opto-magnetic disk according to the present invention on the auxiliary magnetic field.
Figure 12:
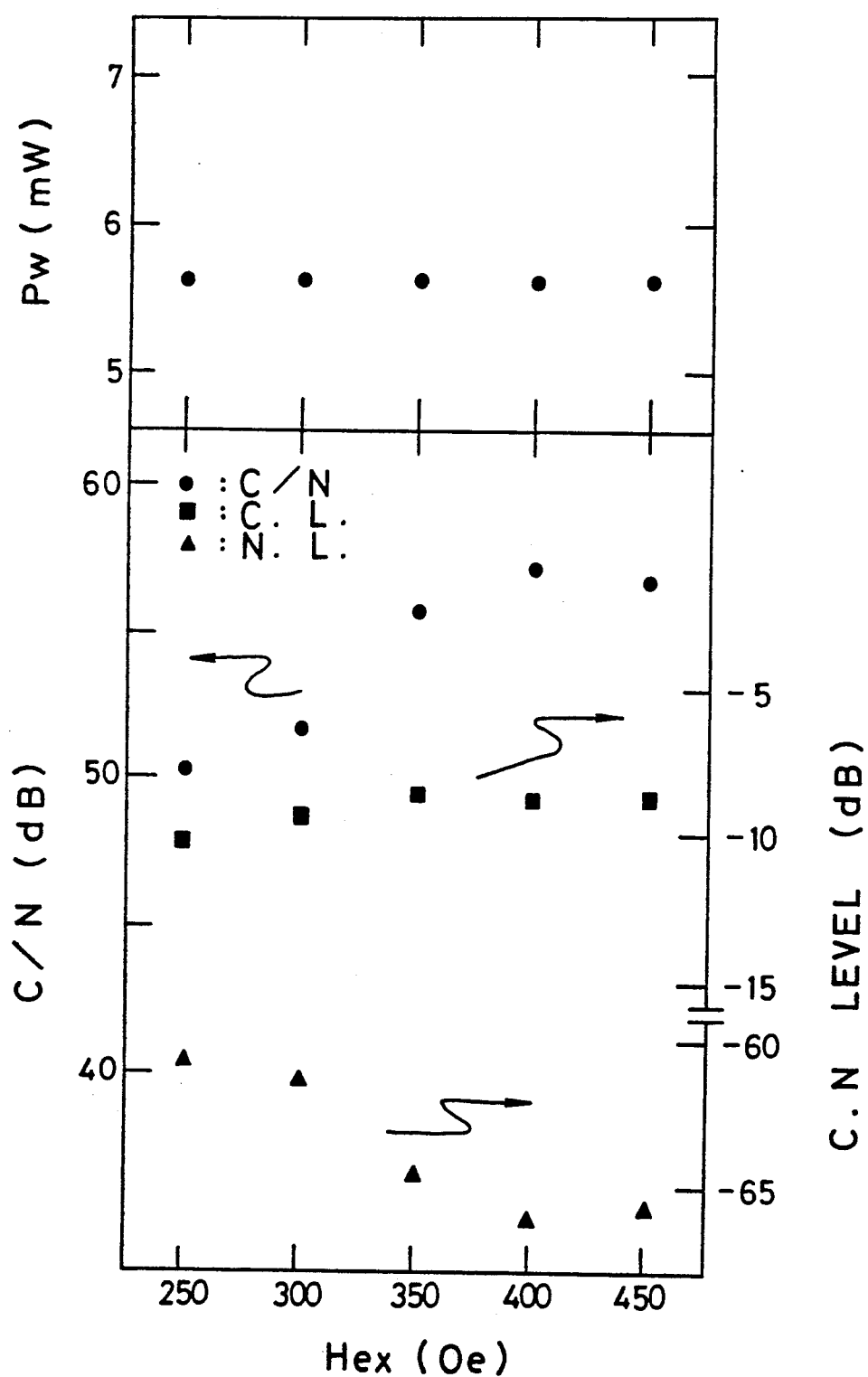

FIGS. 11 and 12 show, respectively, the dependency of the recording/reproducing characteristics on the auxiliary magnetic field for the specimens Nos. 6 and 8. In this case, evaluation conditions for the recording/reproducing characteristics were set as: number of rotation for the optical disk to 1800 rpm, recording diameter to 110 mmΦ, recording frequency to 3 MHz, recording duty to 50% and reproducing laser power to 1.5 mW. In the figures, the recording laser power Pw means a value at which the reproducing secondary harmonic wave level takes a minimum value, and C/N (noise level (N) and the carrier level (C)) means the values at the minimum value described above. As can be seen from the results, the specimen No. 8 has a high C/N, shows no dependency of the recording laser power Pw on the auxiliary magnetic field and is excellent as the optical magnetic disk.

As has been described above, according to the present invention, since a GdDyFeCo film in which sublattice magnetization for the transition metal is predominant at a room temperature is used for the first layer Kerr rotational angle.

Further, since a TbFeCo series film in which sublattice magnetization for rare earth at a room temperature is predominant is used for the second layer (writing layer), a large coercive force and a relatively low curie temperature necessary for the second layer can be obtained. Further, the saturation magnetization for the second layer (writing layer) can be increased along with the increase in the saturation magnetization of the first layer (reading layer).

Then, since directions of the predominant magnetization between the first layer and the second layer are set opposite to each other, after the regular and well-arranged bits are formed in the second layer (writing layer), the bits in the second layer can be transferred with regular and well-arranged shape into the first layer (reading layer) by means of the exchanging force in the temperature lowering step thereby enabling to reduce the writing noises.

What we claimed is:

1. An opto-magnetic recording medium having a perpendicularly magnetized film of a dual layer structure deposited on a substrate comprising, in order, a first layer composed of a rare earth-transition metal amorphous thin alloy film and a second layer composed of a rare earth-transition metal amorphous thin alloy film of a composition different from that of the first layer and having a lower Curie point and a larger coercive force as compared with that of said first layer, said medium being capable of transferring bits recorded at a Curie point in said second layer to the first layer by an exchange-coupling force between said first and second layers, said first layer being composed of a GdDyFeCo film which is made of an alloy represented by the formula:

$$(Gd_{100-X}Dy_X)_Z(Fe_{100-Y}Co_Y)_{100-Z}$$

in which X=5-25 atm %, Y=18-30 atm % and Z=16-24 atm %, wherein the sublattice magnetization for the transition metal in said film is predominant at a room temperature, the second layer being composed of TbFeCo series film in which sublattice magnetization for the rare earth is predominant at a room temperature, and the directions of predominant magnetization between the first layer and the second layer are opposed to each other.

2. The recording medium of claim 1 in which the TbFeCo series film is made of TbFeCo or TbFeCo based alloy in which Tb is partially substituted with another rare earth element such as Gd, Dy, Nd or Ho.

3. The recording medium of claim 1 in which the total thickness of the magnetized film is 15 to 300 nm.

4. The recording medium of claim 1 in which the thickness of the second layer is greater than that of the first layer.

5. The recording medium of claim 1 in which the magnetized film is formed over a transparent substrate selected from the group consisting of glass and resin substrates.

6. The recording medium of claim 5 in which the magnetized film is interposed between a pair of dielectric material layers.

7. The recording medium of claim 1 which shows a Kerr rotation angle $\theta K$ of more than 0.48°.

8. The recording medium of claim 1 which has a saturation magnetization Ms of less than 250 emu/cm$^3$.

* * * * *